L. R. CROM.
STRAW SPREADER.
APPLICATION FILED FEB. 2, 1917. RENEWED APR. 24, 1918.
1,280,674.
Patented Oct. 8, 1918.
2 SHEETS—SHEET 1.
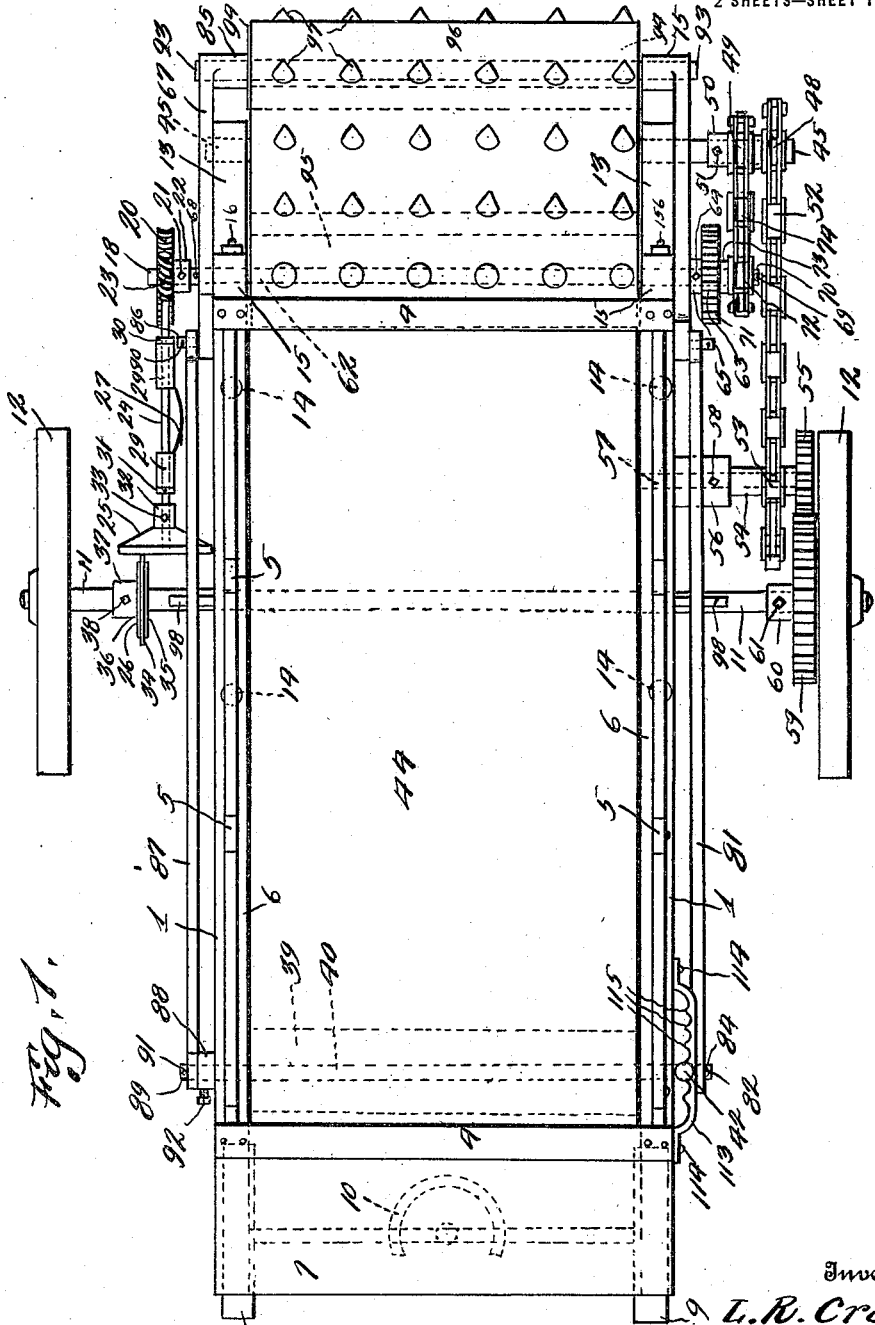

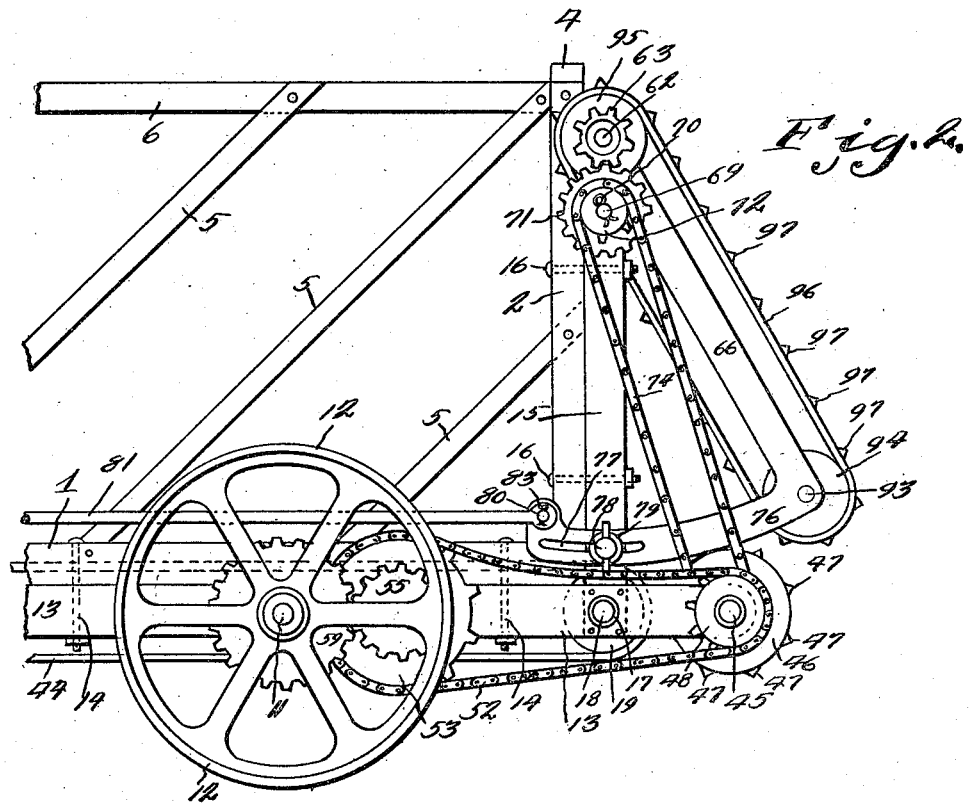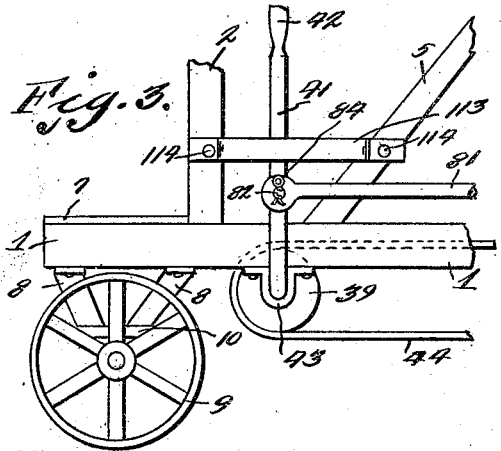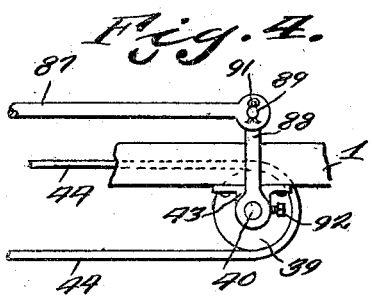

UNITED STATES PATENT OFFICE.

LENNIE RAY CROM, OF SWANTON, NEBRASKA.

STRAW-SPREADER.

1,280,674.      Specification of Letters Patent.      Patented Oct. 8, 1918.

Application filed February 2, 1917, Serial No. 146,225. Renewed April 24, 1918. Serial No. 230,605.

*To all whom it may concern:*

Be it known that I, LENNIE RAY CROM, a citizen of the United States, residing at Swanton, in the county of Saline, State of Nebraska, have invented a new and useful Straw-Spreader; and I do hereby declare the following to be a full, clear, and exact description of the invention, such as will enable others skilled in the art to which it appertains to make and use the same.

The invention relates to straw spreaders.

It seeks to provide, in an apparatus of this kind a horizontal adjustable speed feed belt, a supplementary distributing roll and an adjustable diagonally disposed force-feed apron all so assembled that they may be attached to or detached from the vehicular part of the apparatus.

The structure illustrated in the drawings may require some changes imposed by practice and the right is claimed to make any that do not deviate from the spirit of the annexed claims.

In the drawings:—

Figure 1 is a plan view of the invention, showing the spreader attached to its attendant vehicular apparatus.

Fig. 2 is an elevation of the spreader proper, but a portion of the vehicle body is also shown.

Fig. 3 is an elevation showing how the idle-roll for the feed-belt is attached to the vehicle body and showing also the handle for controlling the adjustable force-feed apron.

Fig. 4 is an elevation on the opposite side of Fig. 3, all parts of the vehicle except that to which the idle-roll is attached being omitted.

The same numerals of reference designate the same parts throughout the several figures, wherein the vehicular apparatus is shown composed of the side-sills 1 with the uprights 2 mounted thereon and secured to them by any conventional means. A forward end-sill connects the sills 1 together at the forward end below the forward uprights 2 and a channel piece (not shown) secures these sills 1 together at a point directly above the rear axle. Further strength is added to the body by the cross-pieces 4 and the diagonal strips 5 supported at their upper-end by the longitudinal piece 6. The vehicular portion is intended to have at its forward-end the driver's platform 7, the wheels 9 with their attendant axle, the conventional fifth wheel 10 and the supports 8 attaching the fifth wheel 10 to the sills 1.

The spreader apparatus has secured rigidly to its axle 11 the wheels 12 and this axle is designed to journal in the longitudinal pieces 13 attachable to or detachable from the sills 1 by tightening or loosening the bolts 14. Connected to the longitudinal pieces 13 by any of the conventional methods are the perpendicular struts 15 which may be connected to or disconnected from the uprights 2 by the insertion or withdrawal of the bolts 16. Where the struts 15 and the pieces 13 join there are bearings 17 in which the shaft 18 revolves. Shaft 18 has rigidly secured to it the feed-belt drive-roll 19, the protruding end of which carries the worm-wheel 20 connected therewith by the set screw 21 which is threaded through the hub 22. This worm-wheel 20 is one of the elements for transmitting motion to the roll 19, the other elements comprising a worm 23 and a disk 25, both attached to the shaft 24, and a friction wheel 26 carried by the shaft 11. The bracket 27 is supported on a longitudinal piece 13 by suitable bolts (not shown) and the shaft 24 revolves in its bearings 29. The worm 23 is fastened to the shaft 24 by any desired means and the collar 30 integral with shaft 24 and the removable collar 31 secure the shaft 24 against longitudinal movement. The disk 25 is held on shaft 24 with a set-screw 33 which is threaded through its hub 32. The friction wheel 26 is composed of a friction disk 34, of any suitable frictional substance, preferably leather, held between the metal disks 35 and 36, disk 36 being integral with the hub 37 through which the set-screw 38 secures the whole wheel 26 to the shaft 11. By loosening screw 38 the wheel 26 may be moved along the shaft 11 and thus brought into contact with different points on the face of the disk 25. This feature enables the speed of the shaft 24 and its worm 23 to be varied with respect to the speed of the axle 11, for when the wheel 26 contacts with a point near the center of the disk 25, it will obviously run the shaft 24 faster than when it contacts with a point near the periphery of the disk, assuming the speed of the wheel 26 to be constant.

At the forward end of the vehicular portion of this apparatus the feed-belt idle-roll 39 is mounted and revolves on the shaft 40, one end 41 of which is up-turned and has formed on it the handle 42. The brackets 43 are bolted on the under-side of sills 1 and serve to support both the roll 39 and the shaft 40. The feed-belt 44 is connected over the rolls 43 and 19 and it is made to travel by means of the motion transmitted to roll 19 through the worm-wheel 20 and its associated parts.

At the extreme end of the longitudinal pieces 13 bearings are formed in which the shaft 45 revolves and this shaft 45 has rigidly connected to it the supplementary distributing roll 46 carrying on its periphery the spurs 47 evenly spaced both longitudinally and circumferentially. Roll 46 receives motion through the medium of a sprocket wheel 48 which together with a smaller sprocket wheel 49, is integral with the hub 50 and attached to the shaft 45 by the set-screw 51. A chain 52 connects the sprocket-wheel 48 with a larger but similar wheel 53 integral with a hub 54 which is also a part of the gear 55. A hub 56 suitably secured to the longitudinal piece 13 acts as a support for the stud 57 whereon the hub 54 with wheels 53 and 55 revolves. The set-screw 58 holds the stud 54 in hub 56 and the free end of this stud is provided with a head or any other conventional means to secure the hub 54 on it. On shaft 11 and so set as to mesh with the gear 55, is the gear 59 having the hub 60 and set screws 61 by which it is attached to shaft 11. By means of the spur gears 55 and 59 and the chain 52 with its attendant sprockets 48 and 53, motion is transmitted from the shaft 11 to the distributing roll 46.

At the uppermost end of the struts 15 are bearings in which the shaft 62 revolves and this shaft carries at one end a gear 63 held thereon by the set-screw 64 which is threaded through its hub 65. Between the hub 65 and one strut 15 is an angular supporting brace 66 having an eye through which the shaft 62 passes and which fits shaft 62 loosely enough to permit the said shaft to revolve therein. On that end of the shaft 62 remote from the gear 63 is a brace 67 and the eye formed in its upper end is kept on the shaft 62 by the insertion of a cotter-pin through the end of the shaft. Directly below the shaft 62, there is fixed by any satisfactory method a shouldered stud 69 and on this stud the gear wheel 71 and sprocket wheel 72 revolve. Wheels 71 and 72 are integral with the hub 73 and the cotter-pin 70 retains them on the stud 69 while the shoulder on this stud spaces them a sufficient distance from the stud 15 to keep the gears 71 and 63 in mesh. A chain 74 connected between the sprockets 49 and 72 transmits the motion derived from the shaft 45 to the shaft 62 by means of the mating-gears 71 and 63.

The angular supporting brace 66 has a bearing formed in its hub 75 where its depending arm adjoins the arm 76 and where the arm 76 passes the strut 15 a slot 77 concentric with the center of the shaft 62 is formed. Through this slot and entering strut 15 is a screw 78 with a winged head and this screw with its washer 79 is intended to hold the arm 76 in close but slidable contact with the strut. Just above the end of slot 77 there is a projection on arm 76 that carries a stationary stud 80. A rod 81 with eyes formed at either end connects between this stud and a stud 82 fixed in the up-turned portion 41 of the shaft 40. Cotter-pins 83 and 84 retain opposite ends of the rod 81 on the studs 80 and 82 respectively.

The angular supporting brace 67 is a substantial equivalent of the brace 66 with the exception that its hub 85 is turned in the opposite direction from hub 75. It connects by means of a stud 86 to a rod 87, identical with rod 81, which rod 87 is designed to connect with a stud 89 which is made integral with the arm 88. Suitable cotter-pins 90 and 91 retain the rod 87 on the studs 89 and 86. The arm 88 where it connects with the shaft 40 is provided with an eye and it is secured on shaft 40 by means of the set-screw 92. It will be seen that the movement of both angular braces 66 and 67 can thus be accomplished by movement of the handle 42, the rods 81 and 87 serving to transmit this movement to the braces 66 and 67 because the shaft 40 of which the handle 42 is a part will transmit any movement (given to the handle 42) to the arm 88 which is connected to the shaft 40.

Journaled in the hubs 75 and 85 is a shaft 93 and this shaft carries rigidly connected to it the roll 94 over which and over a roll 95 rigidly connected to the shaft 62 a belt 96 is connected. The belt 96 carries, equally spaced over its surface both longitudinally and transversely the spurs 97. These spurs together with the belt on which they are mounted act as a force-feed means for whatever may be in the spreader for distribution over the ground.

Attached to the forward upright 2 and to one of the diagonal strips 5 is a rack 113 retained on the strip and the upright by suitable screws 114. This rack has teeth 115 adapted to engage the upright 41, which has enough resiliency at its junction with the shaft 40 to keep it in contact with any pair of teeth between which it may be placed.

When this invention is being used as a spreader for straw, manure and the like, whatever substance to be spread is placed on the belt 44 and is retained thereon to any desired height by the framing composed of the pieces 5 and 6. Any mode of propulsion is then applied to the front wheels 9 and the rear wheels 12 being thus dragged over the ground will transmit a rotary motion to the shaft 11. Viewing the apparatus with the rolls 19 and 46 to the right, the shaft 11 will turn in an anti-clockwise direction. This will result in the gear 59 turning in the same direction and the gear 55 turning in the opposite direction. Sprocket 53 will of course turn in this opposite or clockwise direction and, by virtue of its chain connection to the sprocket 48, will turn this sprocket also in a clockwise direction. Sprocket 48, being rigidly connected to the shaft 45, will turn it and its attendant roll in the same direction as itself and in the proper direction for distributing the substance brought forward by the feed-belt 44. It has been shown that sprocket 48 rotates in a clockwise direction and of course the sprocket 49 which is attached to the same hub as sprocket 48 will also rotate in clockwise direction. The chain 74 between the sprockets 49 and 72 will transmit this same direction of rotation to sprocket 72 and its associated gear 71 but the direction of rotation of roll 95 will be reversed by the meshing of the gears 71 and 63. That side of the feed-belt 96 which is nearest the wheels 12 will then move downwardly, the proper direction for forcing the contained substance down toward the distributing roll 46.

The feed-belt 44 is driven as previously described and in such a direction that the upper side of the feed belt may travel from the front toward the rear. That the proper direction of rotation for the feed-belt 44 is accomplished may be seen from a consideration of the individual elements that form the drive. The friction wheel 26 will turn in the same direction as the axle 11, which is clockwise when this wheel is viewed from its hub end. The disk 25 will then revolve right handedly when viewing the face and this will result in the worm 23 turning right handedly which, if it be a left hand worm, will turn the wheel 20 left handedly or toward the back of the machine. The travel of the feed-belt 44 toward the back of the machine will tend to carry the contained load toward the back. The downward travel of the belt 96 will tend to force the same load downwardly. These two movements co-act to bring the contained substance on to the spur covered distributing roll 46 from which it is dropped to the ground. The position of the roll 94 with its belt 96 may be adjusted with respect to the roll 46, the adjustment being accomplished by the operator who moves his handle 42, thus bringing the upturned rod 41 into contact with various pairs of the teeth 115. The rods 81 and 87 transmit any motion given to the upright 41 and the arm 88 to the angular supporting braces 66 and 67 in the hubs 75 and 85 of which the roll 94 is supported. The braces 66 and 67 are kept in close but slidable contact with the struts 15 by screws 78 with the washers 79 as previously described.

In considering the construction of this mechanism, it will be seen that the arm 88 can be given an angular displacement with respect to the upright 41 by changing the position of arm 88 on the shaft 40. The rods 81 and 87 being of equal length, will cause the roll 94 to assume a diagonal position with any change in the relative positions of arm 88 and upright 41. The bearings in hubs 75 and 85 are, of course, large enough to permit the roll 96 and its shaft 93 to assume any diagonal position within reasonable limits. The advantage of this feature is that the roll 94 may be brought closer to the roll 46 at one end than at the other, thus making it possible to distribute a greater amount of the contained substance at one side of the apparatus than at the other. That side of the apparatus where will occur the greater opening between the rolls 46 and 94 will be determined by the position given to the arm 88 with respect to the upright 41.

The spreader apparatus may be detached from the vehicular apparatus after which the latter may be used as a hay rack, the rack 113 is first disconnected by the removal of the screws 114. The rods 81 and 87 are then removed after the withdrawal of the several cotter-pins which retain them in position. Disconnecting the arm 88 by loosening its set screw 92 will then make it possible to withdraw the shaft 40 with its upturned end 41, whereupon the roll 39 may be removed. Withdrawal of the bolts 14 and 16 will make it possible to remove the rest of the spreader mechanism, the belt 44 being separable, whereupon wheels may be applied to a supplementary axle 98 conveniently secured to the sills 1, thus rendering the vehicular apparatus serviceable for various utilitarian purposes.

What is claimed is:—

1. In a straw-spreader, a vehicular apparatus, a longitudinal feed-belt for the load, a variable speed mechanism for driving said feed-belt, a spur-covered supplementary distributing roll, a spur-covered diagonally disposed force-feed apron, and means within reach of the operator for adjusting the position of the force-feed apron with reference to said distributing roll and to the substance to be spread.

2. In a straw-spreader, a vehicular apparatus, a longitudinal feed-belt for the load, supporting rolls for said feed-belt, a variable speed mechanism for driving said feed-belt, a spur-covered supplementary distributing roll, means for driving said roll positively, a spur-covered diagonally disposed force-feed apron, rolls carrying said apron, means for communicating motion to said apron, and means within reach of the operator for adjusting the position of said apron with reference to said distributing roll and to the substance to be spread.

3. In a straw-spreader, a vehicular apparatus, a spreader apparatus having wheels adapted to engage the ground, a longitudinal feed-belt for the load, a spur-covered supplementary distributing roll, an adjustable diagonally disposed spur-covered force-feed apron, means connected with the aforementioned wheels for driving the feed-belt at different speeds with respect to said wheels and for driving the distributing roll and force-feed apron at a constant speed with respect thereto.

4. In a straw-spreader, a vehicular apparatus, a spreader apparatus, a longitudinal feed-belt for the load, rear and forward supporting rolls for said feed-belt, shafts for both rolls, said forward shaft having a cranked-end at one side of its roll and a detachable arm at the other side, a variable speed mechanism for driving said feed-belt, a supplementary distributing roll, means for driving the same, a diagonally disposed force-feed apron, rolls carrying said apron, angular supporting braces supporting the last-named rolls, connecting links between these supporting braces and the cranked-end and detachable arm of the previously mentioned shaft.

5. In a straw-spreader, a vehicular apparatus, a spreader apparatus comprising a longitudinal feed-belt, a supplementary distributing roll and a diagonally disposed force-feed apron, rolls for carrying said apron, and means for adjusting said force-feed apron with respect to the distributing roll and to the substance to be spread, said means comprising devices adjustable with respect to each other, whereby one of the apron-carrying rolls may be shifted to a diagonal position with respect to the supplementary distributing roll.

6. In a straw-spreader, a vehicular apparatus, a spreader apparatus comprising a longitudinal feed-belt a supplementary distributing roll and a diagonally disposed force-feed apron, rolls for carrying said apron, and means for adjusting said force-feed apron with respect to the distributing roll and to the substance to be spread, said means comprising angular supporting braces, a cranked-shaft, a detachable arm for said shaft and connecting links which connect said angular supporting braces to the cranked-end and detachable arm of said shaft.

In testimony whereof I have signed my name to this specification in the presence of two subscribing witnesses.

LENNIE RAY CROM.

Witnesses:
J. F. HENDRIX,
H. E. CLARK.

Copies of this patent may be obtained for five cents each, by addressing the "Commissioner of Patents, Washington, D. C."